Aug. 20, 1929.  E. C. MYERS  1,724,957

BLANK FOR AND METHOD OF MAKING GEAR SECTORS

Filed April 30, 1928

Witness
T. P. Britt

Inventor
E. C. Myers

Patented Aug. 20, 1929.

1,724,957

UNITED STATES PATENT OFFICE.

EDWARD C. MYERS, OF MILWAUKEE, WISCONSIN, ASSIGNOR TO WEHR COMPANY, OF MILWAUKEE, WISCONSIN.

BLANK FOR AND METHOD OF MAKING GEAR SECTORS.

Application filed April 30, 1928. Serial No. 273,937.

This invention relates to a method of making gear sectors and to the resulting gear sector.

In making gear sectors, it is the usual custom to make an entire gear wheel whether it be a spur or worm wheel, or other type of gear wheel, and after cutting the teeth on the entire wheel, to cut away a portion of the wheel to leave the desired sector. This process is extremely wasteful, both of material and of time, and is the one universally employed in making gear sectors.

This invention is designed to overcome the defects noted above and objects of such invention are to provide a novel method of making gear sectors which produce gear sectors without any waste whatsoever, either of material or time, which permits the machining or cutting of the gear teeth completely around a wheel, and which subsequently permits the separation of the wheel into two portions, each of which is provided with a distinct and separate hub complete in itself, and rigid with its corresponding sector.

Further objects are to provide a device which may be readily cast and machined, which is simple to produce, and which is wholly satisfactory in operation and is devoid of any fragile or easily broken parts.

The various steps in the process of forming the device and also various forms that the device takes are shown in the accompanying drawing in which.

In producing the device, a rim 1 is cast as a continuous ring completely around the wheel. A pair of distinct and separate hubs 2 are also formed and are joined to diametrically opposite sections of the rim 1 by means of slanting flanges 3, as shown most clearly in Figure 2. Further, at the point where the flanges approach each other, apertures 4 are formed as shown particularly in Figure 1.

Figure 1:
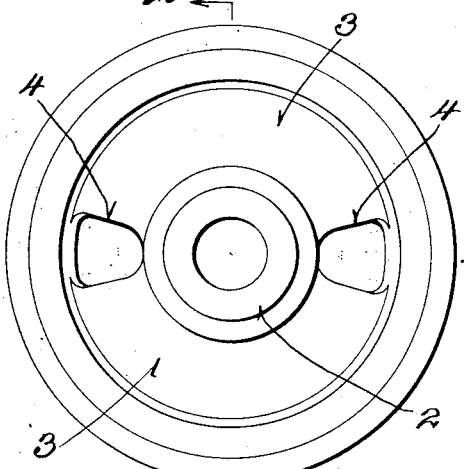
Figure 1 is a view of the device just after it has been cast and before any machining.
Figure 2:
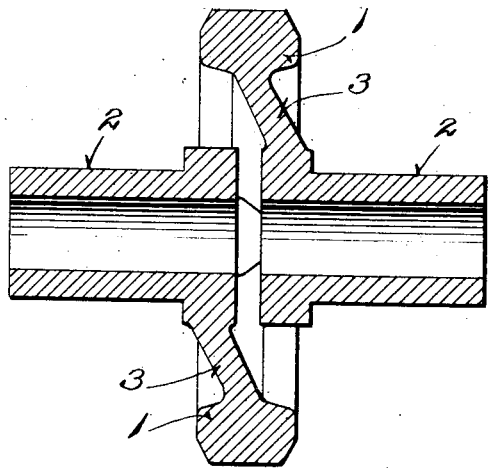
Figure 2 is a transverse sectional view on the line 2—2 of Figure 1.

The device as it appears just before cutting the gear teeth therein is shown in Figures 1 and 2. With the device in this stage, it is placed upon a mandrel and the gear teeth are gradually formed completely around the rim 1, such gear teeth being indicated by the reference character 5 in Figures 3 and 4.

In forming these gear wheels, it is the regular practice to cut the gear teeth completely around the rim prior to any other operation.

Figure 3:
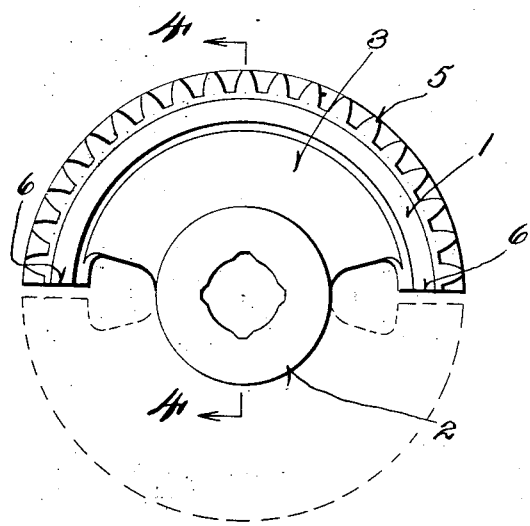
Figure 3 is a front view of the device after it has been separated into two sectors, such view showing one of the sectors.
Figure 4:
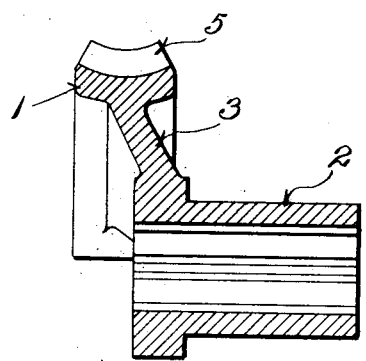
Figure 4 is a sectional view on the line 4—4 of Figure 3.

In the usual practice, the wheel is shaped to a sector by cutting away and discarding a large portion of the wheel. However, with this invention, the loss noted above is not necessitated. All that is necessary is to form a cut 6 transversely across the rim at opposite points to the holes 4, as indicated in Figure 3. This separates the device into two distinct and similar sections, each of which is provided with a rim equipped with gear teeth properly cut, and also each is equipped with a distinct and complete hub.

The invention is applicable to any type of gear wheels, whether worm gear, spur gear, or other types of wheels. It is particularly adapted to worm gears, although it is not intended to limit the invention to worm gears other than as defined in certain of the claims hereinafter appearing.

It will be seen that the invention fulfills a long felt want in that it provides a very simple method of making gear sectors without waste and with the utmost ease.

Further, it will be seen that the method substantially doubles the output for any given time, as two sectors result from each operation.

Although the invention has been illustrated as directed to the production of two sectors at a time, it is obvious that any number of sectors with their corresponding hub portions could be produced. This could readily be accomplished as all of the hubs would be aligned and as each hub would be joined to its portion of the ring by an appropriately shaped and slanted web.

Although the invention has been described in considerable detail, such description is intended as illustrative rather than limiting as the invention may be variously embodied and as the scope of such invention is to be determined as claimed.

I claim:

1. A device of the class described comprising an annular ring adapted to have gear teeth cut therein, a plurality of separate webs carried by said ring, and a hub carried by each web.

2. A gear blank comprising an annular ring, a pair of opposed, aligned and spaced hubs, and a pair of spaced webs joining said hubs to said ring.

3. A gear blank comprising an annular ring adapted to have teeth formed therein, a pair of axially aligned hubs, a web for each hub joining such hub to said ring, said webs being axially spaced apart, and said webs having openings at their adjacent edges.

4. The method of forming gear sectors comprising forming an annular ring integral with a pair of spaced webs carrying independent hubs, cutting teeth upon said ring, and cutting said ring into segments.

5. The method of forming gear segments consisting in forming an annular ring having distinct hubs connected to said ring, forming teeth completely around said ring, and subsequently separating said ring into segments, each segment having a web and a hub.

6. The method of forming worm wheel sectors comprising forming an annular ring having a plurality of distinct and separate web portions with each web portion having an integral hub, machining worm wheel teeth completely around the ring, and cutting said ring into segments each having a web and a hub.

In testimony that I claim the foregoing I have hereunto set my hand at Milwaukee, in the county of Milwaukee and State of Wisconsin.

EDWARD C. MYERS.